United States Patent
Medin (10) Patent No.: US 8,087,787 B2
(45) Date of Patent: Jan. 3, 2012

(54) MAXIMIZING PERFORMANCE OF AN ELECTRONIC DEVICE BY MAINTAINING CONSTANT JUNCTION TEMPERATURE INDEPENDENT OF AMBIENT TEMPERATURE

(75) Inventor: David L. Medin, Los Altos, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 690 days.

(21) Appl. No.: 12/209,128

(22) Filed: Sep. 11, 2008

(65) Prior Publication Data

US 2010/0060861 A1 Mar. 11, 2010

(51) Int. Cl.
*G03B 21/26* (2006.01)

(52) U.S. Cl. ............... 353/52; 353/54; 353/57; 355/30; 372/34

(58) Field of Classification Search ............ 353/57, 353/52, 94, 121, 54; 372/34; 355/30
See application file for complete search history.

(56) References Cited

U.S. PATENT DOCUMENTS

| | | | |
|---|---|---|---|
| 6,710,762 B1 * | 3/2004 | Hasegawa | 345/101 |
| 7,564,435 B2 * | 7/2009 | Nakamura et al. | 345/87 |
| 2005/0254013 A1 * | 11/2005 | Engle et al. | 353/52 |
| 2005/0254023 A1 * | 11/2005 | Salvatori et al. | 353/122 |
| 2008/0036975 A1 * | 2/2008 | Yang et al. | 353/57 |
| 2008/0165815 A1 * | 7/2008 | Kamijima | 372/34 |

* cited by examiner

*Primary Examiner* — Georgia Y Epps
*Assistant Examiner* — Kevin Wyatt
(74) *Attorney, Agent, or Firm* — Fish & Richardson P.C.

(57) ABSTRACT

Methods and apparatus are disclosed for maximizing performance of an electronic device, such as a display device. Aspects of the exemplary embodiments include operating the electronic device by adjusting power to the device to maintain a predetermined junction temperature of the device independent of the ambient temperature at which the device is operating.

14 Claims, 4 Drawing Sheets

MAXIMIZING PERFORMANCE OF AN ELECTRONIC DEVICE BY MAINTAINING CONSTANT JUNCTION TEMPERATURE INDEPENDENT OF AMBIENT TEMPERATURE

BACKGROUND

Most electronic devices generate heat during normal operation. Electronic devices can malfunction and fail if they overheat, and therefore manufacturers endeavor to design the devices so that overheating does not occur. Manufacturers of electronic devices incorporating semiconductors typically design each electronic device with a maximum allowable junction temperature at which the electronic device should function correctly. The junction temperature of a semiconductor device is the temperature of the semiconductor junction where the semiconductor device generates a maximum amount of heat. Increasing junction temperature can reduce product lifetime of the electronic device and increase the likelihood of product failure. Therefore, a cautious manufacturer will usually design the electronic device to operate below the maximum allowable junction temperature at a maximum specified ambient temperature to increase lifetime and reliability, where the ambient temperature is the air temperature of the surrounding environment.

For example, consumer electronics products may be required to operate at maximum junction temperature of 125° C. and maximum ambient temperatures up to 45° C., while commercial and automotive electronics are typically required to operate at a maximum junction temperature of 125° C., but ambient temperatures up to 70° C. and 85° C., respectively. The manufacturer may also specify a minimum ambient temperature for the electronic device.

If the maximum junction temperature of a semiconductor device is 125° C. and the maximum ambient temperature is specified at 45° C., then the device must generate no more than 80° C. at the semiconductor junction. During operation of an electronic device, the ambient temperature may vary, but the electronic device dissipates heat in a manner such that the junction temperature always remains less than some A above the ambient temperature. Given this information, the manufacturer typically calculates how much power can be input to the semiconductor device to keep the junction temperature within this limit. The manufacturer may also design sufficient cooling of the device to enable it to dissipate the junction temperature heat and operate safely at the maximum ambient temperature, whether by convection into the air or with the aid of cooling devices. After the design stage, electronic devices are manufactured and shipped to the consumer.

During operation, electronic devices having variable power inputs may reduce heat at elevated temperatures by limiting the power input to the semiconductor devices, but doing so also results in reduced performance. Electronic devices having fixed power inputs typically reduce heat at elevated temperatures by increasing cooling through active external cooling devices, such as by increasing the speed of a fan. Examples of such devices include certain laptop computers. The active cooling devices are typically run as a function of the clock frequency of the device, ambient temperature, and/or junction temperature. For example, an electronic device may run the fan at the highest speed when the clock frequency of the CPU is maximized or when a device is at or near the maximum ambient or junction temperature, and then lower the fan speed at reduced clock speed and/or lower ambient/junction temperatures to save power and reduce noise.

An example of an electronic device is a display device. A specific type of display device is a video projector, which takes a video signal and projects a corresponding image on a screen or other flat surface using a lens and an illumination source. When light emitting diodes (LEDs) or solid state lasers are used for the illumination source, the drive current input to the devices directly affects the brightness of the display. In some applications, a projector may use a combination of solid state lasers and LEDs. For come colors one or the other is more economical. However, increasing the drive current increases the brightness of the devices, but also increases the junction temperature, which reduces the life of the devices and, potentially, other components of the video projector.

Traditional LED and solid state laser projectors are designed the same way as electronic devices in general. Manufacturers design them to operate at a maximum junction temperature and at minimum and maximum ambient temperatures. The manufacturers then determine how much power or drive current to input to the illumination source during operation, and provide the projectors with a cooling device, such as a fan, that is run at a sufficient speed to prevent the projector, and in particular the illumination device from overheating. If the ambient or junction temperature decreases during operation, the cooling device may be run at a lower speed to reduce noise and conserve power.

Thus, conventional electronic devices, such as LED projectors, use a fixed drive current and variable cooling to keep the devices operating at or below the specified maximum junction temperature, which rises and falls based on the ambient temperature. Although such a design methodology keeps devices operating at below the specified maximum junction temperature and may maximize the lifetime of the devices, such techniques fail to maximize performance at all ambient temperatures.

For example, assume that the maximum reliable junction temperature of an LED projector is 125° C. and the maximum ambient temperature is specified at 45° C. In this case, the LEDs will operate at 80° C. above ambient temperature and assume the LEDs produce 50 lm of brightness. If during operation of the LED projector, the ambient temperature falls to 35° C. or to 25° C., then the junction temperature of the LED may also reduce to 115° C. and 105° C., respectively. In each instance, however, the LED will continue to operate approximately at a junction temperature of about 80° C. above ambient, and the brightness of LED remains unchanged at 50 lm. This example may be oversimplified in that as the ambient temperature decreases, the junction temperature must follow, but perhaps not exactly linearly, as the cooling settings may be reduced as ambient temperature decreases. Additionally, reducing the junction temperature can increase the efficiency of the LED so the LED brightness may increase a few lumens as the junction temperature decreases.

Generally speaking, while decreasing the performance of cooling devices in electronic devices results in increased heating of the devices and may result in decreased performance, increasing the performance of the cooling device results in more cooling, but does not increase device performance. This is because the maximum junction temperature is used to calculate a constant input drive current, which in turn places a limitation on the output brightness of the LEDs. The result in the case of LED projectors is that whether the ambient temperature falls and/or whether the cooling device is operated at maximum, the LED produces substantially the same brightness at lower ambient temperatures as it does at higher ambient temperatures.

SUMMARY

Exemplary embodiments provide methods and apparatus for maximizing performance of an electronic device, such as a display device. Aspects of the exemplary embodiments include during operation of the display device, adjusting power to the display device to maintain a predetermined junction temperature independent of an ambient temperature in which the display device is operating.

According to the method and system disclosed herein, the exemplary embodiment provides the electronic device with a variable power input and a predetermined junction temperature at any given ambient temperature in order to maintain a maximum performance level of the device. This is in contrast to conventional electronic devices that have a fixed power input and a variable junction temperature that rises and falls with ambient temperature. The effect is increased display brightness at lower ambient temperatures. Further more other cooling techniques may be used to control junction temperature, such as a variable speed fan whose speed can be increased to increase cooling, thereby lowering the junction temperature to improve the life of the electronic device or, alternatively, permitting higher power to be applied to the device, thereby increasing brightness without the device junction temperature going over a predetermined limit.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The present invention relates to a method and apparatus for maximizing performance of an electronic device by maintaining constant junction temperature independent of ambient temperature. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein and the claims which follow.

The exemplary embodiments provide methods and apparatus for maximizing the performance of an electronic device by maintaining constant junction temperature independent of ambient temperature.

Figure 1:
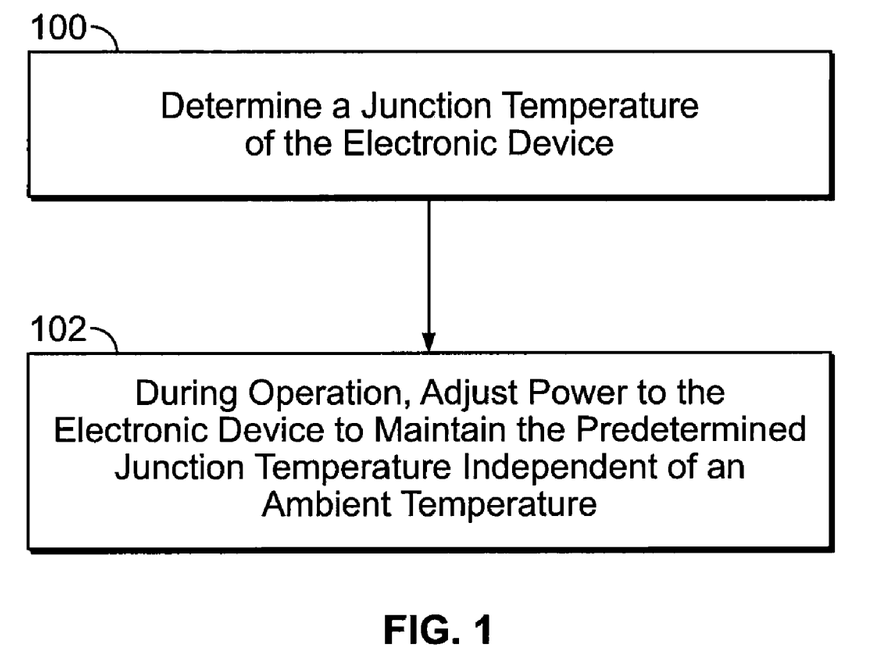
FIG. 1 is a flow diagram illustrating a process for maximizing performance of an electronic device according to an exemplary embodiment.

FIG. 1 is a flow diagram illustrating a process for maximizing performance of an electronic device according to an exemplary embodiment. The process may begin during a design stage of the electronic device by determining a desired junction temperature of the electronic device (block 100). This predetermined junction temperature may be chosen at a point where performance of the electronic device is maximized for a given application or chosen set of criteria. In one embodiment, the electronic device may comprise a display device, such as a video projector.

During operation of the electronic device, power to the electronic device is adjusted to maintain the predetermined junction temperature independent of an ambient temperature in which the display device is operating (block 102). In one embodiment, the power input to the electronic device may comprise current or voltage. When power is input to an electronic device, a percentage of the power results in an operating junction temperature of the electronic device. According to the exemplary embodiment, the input power to the electronic device may then be continuously adjusted to maintain the operating junction temperature at or substantially near the predetermined junction temperature independent of the ambient temperature.

According to the exemplary embodiment, the electronic device is provided with a variable power input designed to maintain a fixed junction temperature at any given ambient temperature in order to maintain a maximum performance level of the device. This is in contrast to conventional electronic devices that have a fixed power input that produces a variable junction temperature that rises and falls with the ambient temperature. Thus, a new methodology is provided for designing and operating an electronic device in which a predetermined desired junction temperature for the electronic device is determined based on a desired lifetime and performance level of the device, and where the desired junction temperature is maintained during device operation by varying the input power. The effect is increased performance, or brightness in the case of display devices such as LED projectors, when the ambient temperatures are lower. Because the LED projectors will become brighter as more drive current is input into the LEDs (up to a certain point) as the junction temperature decreases, and the LED projector is operated such that the drive current is adjusted to maintain the predetermined junction temperature, the LED operates at its brightest possible level without undue degradation for any ambient temperature.

With a conventional LED projector, if the maximum reliable junction temperature of the LED is 125° C. and the maximum ambient temperature is specified at 45° C., the LED will always operate at about 80° C. above ambient temperature. At 25° C. ambient, the junction temperature of the LED reduces by about 20° C. to approximately 105° C. and the LED will continue to receive the same amount of drive power and will continue to operate at a junction temperature of about 80° C. higher than the ambient temperature. At 45° C., the conventional LED projector and the LED projector of the exemplary embodiment will both operate at a junction temperature 80° C. above ambient, so the drive power and the LED brightness in both examples are equivalent. However, when the ambient temperature drops to 25° C., the brightness of the LED in the conventional LED projector is substantially unchanged, while in the exemplary embodiment, the LED produces significantly more light because the LED will then be driven with sufficient increased drive power to maintain the junction temperature at 125° C.

The exemplary embodiment will be described by way of an example where the electronic device comprises a display device, such as an LED projector. However, the methods and apparatus disclosed herein are intended to apply to any electronic device in which power in the form of drive current or voltage generates heat and thus an increased temperature of an electronic device.

Figure 2:
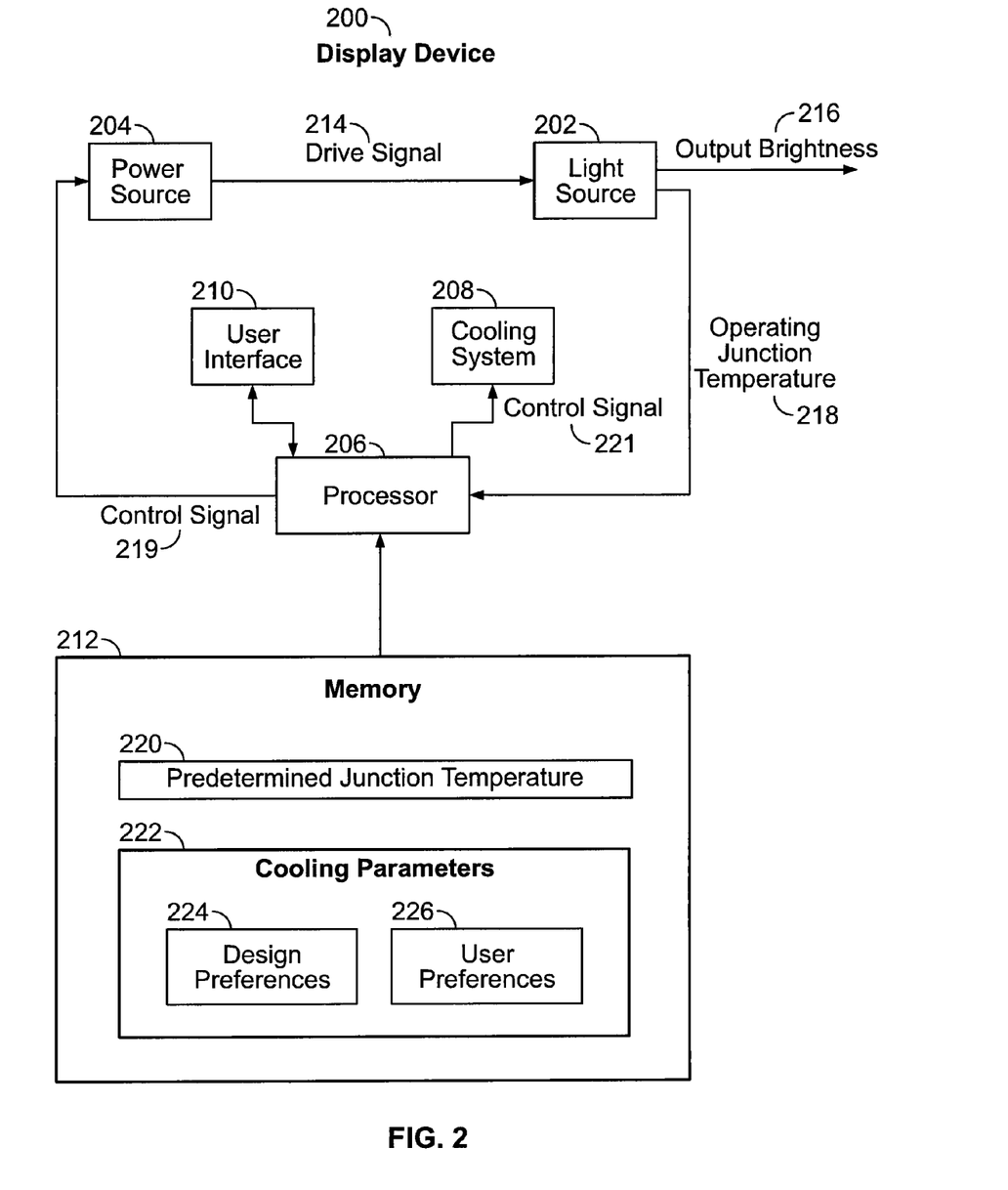
FIG. 2 is a block diagram illustrating basic components of a display device according to an exemplary embodiment.

FIG. 2 is a block diagram illustrating basic components of a display device according to an exemplary embodiment. The display device 200 comprises a light source 202, a power source 204, a processor 206, a cooling system 208, a user interface 210, and memory 212. The power source 204 is coupled to the light source 202 and generates a drive signal 214 for the light source 202. The drive signal 214 may be implemented as either a drive current or drive voltage. For example, in one embodiment the display device 200 comprises an LED projector and the power source 204 may generate a drive current for an LED light source 202.

The light source 202 receives the drive signal 214 from the power source 204 and generates an output brightness signal 216 that is a function of the strength of the drive signal 214. The light source 202 also generates heat that impacts the junction temperature 218 of a semiconductor device. During operation, the operating junction temperature 218 of the semiconductor device is measured and is input to the processor 206. There are numerous commercially available devices for measuring semiconductor and LED junction temperatures and a discussion of such devices is outside the scope of this disclosure. However, one example device for measuring junction temperature is referred to as a thermistor, which is a resistor that varies a known way with temperature. For example, the junction temperature of an LED illumination device may be measured using a thermistor located adjacent to the package containing the LED device. For example a voltage can be placed across the thermistor and the voltage drop measured with an A/D converter. LED packages having built-in thermistors to measure temperature are commercially available.

The processor 206 controls the operation of the display device 200 and may be coupled to the light source 202, the power source 204, the cooling system 208, the user interface 210, and the memory 212. The processor 206 is capable of executing software for controlling various components of the display device 200, including the power source 204 and the cooling system 208. The processor may control the power source 204 via a control signal 219, and may control the cooling system 208 with a control signal 221.

The processor 206 may be implemented as any type of processing device, including a microprocessor, a digital signal processor (DSP), an application specific integrated circuit (ASIC), or any combination thereof. The user interface 210 is coupled to the processor 206 and includes buttons/dial and/or a touchscreen that enables a user to control the operation of the display device 200.

Memory 212 may comprise any type of volatile or non-volatile memory, such as a Flash memory, which may be preferred. Stored in the memory 212 is the predetermined junction temperature 220 as well as cooling parameters 222 specified for the display device 200. In one embodiment, the cooling parameters 222 may comprise design preferences 224 set by the manufacturer and/or user preferences 226 that are set by the user, as will be described below.

During operation of the display device 200, the operating junction temperature 218 is measured and input to the processor 206. The processor 206 monitors the operating junction temperature 218 and controls the power source 204 so that the drive signal 214 is continuously adjusted to keep the operating junction temperature 218 substantially the same as the predetermined junction temperature 220. The result is the highest output brightness 216 of the light source 202 over a range of ambient temperatures, while maintaining a desired expected lifetime of the light source 202.

The processor 206 instructs the cooling system 208 to provide cooling to the light source 202 independent of ambient temperature based on the cooling parameters 222. The cooling system 208 may include passive cooling devices and/or active cooling devices. An example of a passive cooling device is a heat sink. Examples of active cooling devices include, but are not limited to, a fan, liquid cooling devices, and Peltier cooling devices.

Preferred cooling devices are variable cooling devices, such as a variable speed fan, or other cooling device where its degree of cooling can be microprocessor controlled. With such cooling devices, when the ambient temperature rises, the amount of cooling can be increased under control of processor 206. As processor 206 also controls the power to the device, an intelligent control system can determine, when ambient temperature rises, whether it is better to increase the fan speed (resulting often in increased fan noise), or to decrease the power to the drive signal 214, thus lowering the operating junction temperature 218, or some combination of the two.

The processor operation may be determined by a user setting. The user may want a "quiet" mode of the display, for example, for viewing movies. Alternatively, if the display is operating on batteries, the use may want to save fan power. Or the user may wish to operate in a "turbo mode" to obtain absolute brightness regardless of lifetime of LED or the fan. The processor 206 can take the user inputs, set, for example, by a dial or by an input to the remote control for the projector, and calculate the optimum combination of power to the light source 202 and fan speed to accomplish the desires of the user indicated by the selected setting. In other words, the user setting will predetermine one or more projection parameters, such as the degree of display brightness, the lifetime of the display device or the amount of fan noise (or fan speed) or a combination of these.

Another embodiment may allow the user to select "turbo" mode for a predetermined amount of time, and then automatically reset thereafter to a more conservative setting. Another embodiment allows the processor to make a determination of both cooling amount (such as fan speed) and power to the light source 202 by detecting the brightness of the incoming video and adjusting brightness based upon the detection of a particular image or type of image. In that case, the processor 206 may at the same time cause an increase in cooling if possible and desirable.

The design preferences 224 may be the default preference and may include multiple design preferences 224. According to the exemplary embodiment, each design preference 224 specifies cooling the display device 200 at a respective maximum constant rate independent of ambient temperature. According to another aspect of the exemplary embodiment, during cooling under the default design preferences 224, both the drive signal 214 and the active cooling devices are run at maximum levels, except when the junction temperature becomes too high, at which point the drive signal 214 is lowered; but the cooling remains constant. In the example of an LED projector, a fan is used for cooling and based on the design preferences 224, the fan speed remains constant during normal operation. There is no reason to turn the fan speed down when the ambient temperature drops because the drive signal 214 will be increased to ensure the junction temperature remains constant. This is in contrast to conventional devices in which the cooling system is variable and turned up or down based on the ambient temperature.

Alternatively, other of cooling can be employed. For example, a refrigerant, such liquid nitrogen, can be used. The flow of the refrigerant can be varied, as is known in the art, to provide more or less cooling, as needed or desired. Similarly, a Peltier cooler may be used that has the capability of varying the amount of cooling, for example, thermostatically.

However, according to a further embodiment, the user preferences 226 of the cooling parameters 222 are provided for enabling a user of the display device 200 to override the constant rate cooling of the design preferences 224 and to control the cooling of the light source 202 manually. To implement the user preferences 226, the user interface 210 may be provided with cooling buttons or a dial with positions that are each associated with respective ones of the user preferences 226 for activating the user preferences 226. When one of the buttons is pushed, or the dial is set, a signal is sent to the processor 206, and in response, the processor 206 retrieves the user preference associated with the pressed button or dial selection. The processor 206 then instructs the cooling system 208 to begin cooling the light source 202 based on the retrieved user preference 226.

The user preferences 226 are provided as overrides to the normal operation of the constant rate design preferences 224. Active cooling systems, such as fans, make noise, and in some environments, the user may need the display device 200 to be quiet, while in other environments, the user may need the LEDs to be extremely bright with little concern either for fan noise or for the lifetime of the LEDs.

As another example, user preferences 226 for an LED projector could be provided that have four cooling modes for driving a fan: a standard mode for driving the fan at, e.g., 12 volts, a quiet mode, for driving the fan at, e.g., 10 volts; a turbo mode for driving the fan in overdrive; and a super bright mode, where the fan is turned-off and the LED is overdriven. Separate buttons or dials or other user interface, such as selections made on a remote control, as is well known in the art, may be provided on the LED projector or the remote for each mode. When the super bright selection is made, the LEDs may be run at 110° C. junction temperature instead of a desired or predetermined junction temperature of 100° C. This mode provides greater brightness, but at a shortened lifespan of the LEDs. By providing the user preferences 226 in this manner, the user is able to change brightness and lifetime settings of the LED/light source 202, whereas conventional LED projectors/display devices use fixed, rather than variable parameters.

Figure 3:
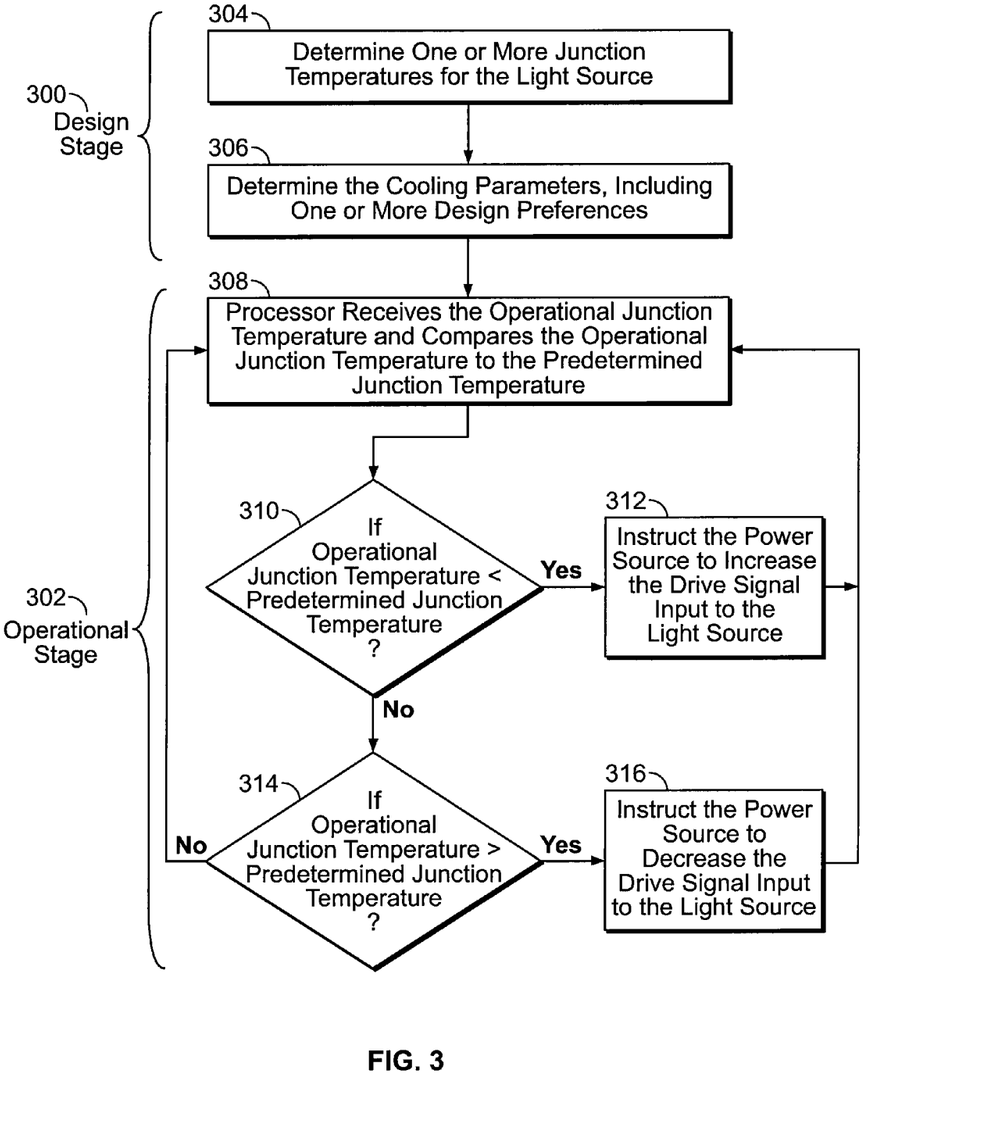
FIG. 3 is a flow diagram illustrating a process for maximizing performance of the display device for maintaining constant junction temperature independent of ambient temperature.

FIG. 3 is a flow diagram illustrating a process for maximizing performance of the display device 200 for maintaining constant junction temperature independent of ambient temperature. The process includes a design stage 300 and an operation stage 302. During the design stage 300, one or more desired junction temperatures 220 are determined for the light source 202 (block 304). In addition, the cooling parameters 222 are determined, including one or more design preferences 224 (block 306).

The determination of the desired junction temperatures 220 is a design parameter that may define a trade-off of light source 202 lifetime versus brightness, while the determination of the cooling parameters 222 defines a trade-off of noise versus brightness. Both the desired junction temperatures 220 and the design preferences 224 may be determined based on one or more optional user preferences 226. The user preferences 226, in turn, may be determined based on the application in which the display device 200 will be used.

According to the exemplary embodiment, the display device 200 can be provided with one or more desired junction temperatures 220 that provide a plurality of constant temperature settings of the light source 202. In one embodiment, the desired junction temperatures 220 may be based on user preference and/or content displayed by the display device. As described above, multiple user preferences 226 may be defined. For example, one user preference could be based on running cooler, where the light source 202 is always run at a junction temperature 220 of 120° C., resulting in a longer light source lifetime and lower brightness. While another user preference could be based on running hotter, resulting in greater brightness but a shorter device lifetime. While another user preference could be based on no cooling at all, in which the LEDs run at a desired predetermined juncture temperature of 150° C., resulting in super brightness but extremely short LED lifetime. In another embodiment, the desired junction temperature 220 could be based on video content displayed to the display device 200. When displaying content such as a movie, not as much brightness is necessary, and power may be a consideration, especially if the unit is operating on batteries. In that situation, the desired junction temperature 220 may be lower than when displaying computer data.

Referring to FIG. 2, in one embodiment, the desired predetermined junction temperature 220 and the cooling parameters 222 are determined by the manufacturer and stored in the memory 212 of the display device 200 prior to shipping. However, in another embodiment, the display device 200 may include an I/O port (not shown) such that the desired junction temperature 220 and the cooling parameters 222 may be received and updated after manufacture.

Referring to FIGS. 2 and 3, during the operational stage 302, the display device 200 is operating. In response to the processor 206 receiving the operating junction temperature 218 generated from the light source 202, the processor 206 compares the operating junction temperature to the predetermined junction temperature 220 (block 308). If the processor 206 determines that the operating junction temperature 218 is less than the desired junction temperature 220 (block 310), then the processor 206 instructs the power source 204 to increase the drive signal 214 input to the light source 202 (block 312). If the processor 206 determines that the operating junction temperature 218 is greater than the desired junction temperature 220 (block 314), then the processor 206 instructs the power source 204 to decrease the drive signal 214 input to the light source 202 (block 316).

Figure 4:
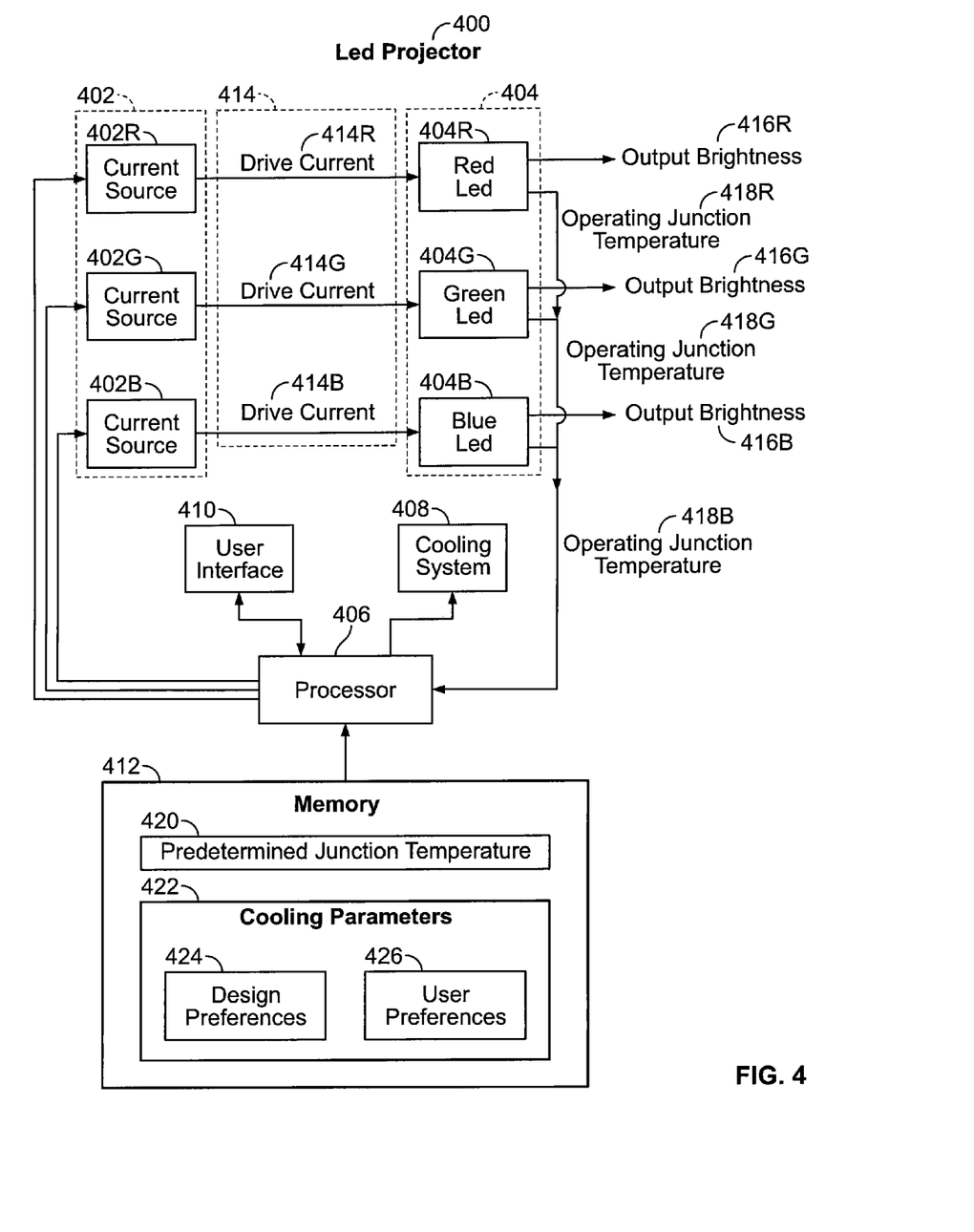
FIG. 4 is a block diagram illustrating basic components of an LED projector operating according to an exemplary embodiment.

FIG. 4 is a block diagram illustrating basic components of an LED projector operating according to an exemplary embodiment. The LED projector 400 includes the same basic components of the display device 200 shown in FIG. 2, including a light source 404, a power source 402, a processor 406, a cooling system 408, a user interface 410, and a memory 412.

However, with the LED projector 400, the light source 404 comprises a red LED 404R, a green LED 404G, and a blue LED 404B. Similarly, the power source 402 comprises three current sources 402R, 402G and 402B. The drive signal 414 comprises three drive currents 414R, 414G, and 414B that are input to the corresponding LEDs 404R, 404G, and 404B. In response to drive current 414R, LED 404R produces output brightness 416R and operating junction temperature 418R. LED 404G produces output brightness 416G and operating junction temperature 418G. And LED 404B produces output brightness 416B and operating junction temperature 418B.

According to the exemplary embodiment, the process for maintaining the junction temperature may be used to advantageously control the LED's 404R, 404G, 404B to produce a desired white balance within a predetermined tolerance. Where it is difficult to achieve a perfect white balance, one that is not perfect may be acceptable for the application.

White balance includes a desired ratio of red, green and blue produced by the corresponding red, green and blue LED's 404R, 404G, 404B. For example, 50% green, 25% red, and 25% blue, provides a certain white point, which, in certain systems may be about 8000° K. Some might prefer 8500° K which is bluer, while others might prefer a white balance that is redder or greener. Selecting the white balance for the LED projector 400 may be part of the design stage 300 (FIG. 3) and may be based on many different factors, such as the types of cooling devices used and their properties.

From time to time, an LED manufacturer may recommend maximum LED temperatures. For example, one manufacturer recommends a maximum junction temperature of 80° C. for the red LED. That translates into 60,000 hours lifetime of the red LED. At 100° C., that LED should last only about 15,000 hours. Somewhere between 110° C. and 120° C., the lifetime is reduced to 5000 hours. LED projectors are often rated to operate at 45° C. ambient temperature. That means that conventional LED projectors will operate the red LEDs at about 35° C. above ambient temperature rating. Using the invention, however, the same red LED can operate at 90° C. above ambient temperature if the red LED is powered to a junction temperature of 110° C. with an ambient temperature of about 20° C. Such operation provides substantial extra brightness.

During operation of the LED projector, the operating junction temperatures 418R, 418G, 418B are input to the processor 406. Based on many different factors, one of the LEDs 404R, 404G, 404B may reach its operating junction temperature 418R, 418G, 418B, respectively, at a lower system brightness compared to the other two.

According to the exemplary embodiment, the processor 406 controls white balance by detecting which one of the LEDs 404R, 404G, 404B reaches the predetermined junction temperature 420 first, and then instructs the current sources 402R, 402G and 402B of the other two LEDs to modify the drive currents appropriately to maintain the white balance. For example, continuing with the example above where the white balance requires 50% green, 25% red, and 25% blue, if the blue LED 404B reaches its operating junction temperature 418B first, then the processor 406 may instruct the current source 402B to maintain its drive current 414B at its present level, and instruct current sources 402R and 402G to decrease their drive currents 414R and 414G to maintain the 50% green, 25% red, and 25% blue ratio of the output brightness.

In another embodiment, the processor 406 may be configured to control white balance based on the application environment. For example, if the LED projector 400 is being used for a business application, the user may care more about brightness than color accuracy and therefore want all three LEDs 404R, 404G, 404B run at the predetermined junction temperature 420 for maximum brightness. If, on the other hand, the LED projector 400 is being used for displaying a movie, then color accuracy may be very important, in which case the above process may be used for controlling white balance by determining which LED reaches the desired junction temperature 420 first and then adjusting the other LEDs based on the first one.

A method and system for maximizing performance of an electronic device by maintaining constant junction temperature independent of ambient temperature has been disclosed. In addition, junction temperature can be controlled by controlling in combination the power to the electronic device and the amount of cooling applied to the device. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Accordingly, many modifications may be made by one of ordinary skill in the art without departing from the spirit and scope of the appended claims.

What is claimed is:

1. A method for maximizing brightness of a display device, comprising:
    during operation of the display device, adjusting power to the display device to maintain a predetermined junction temperature substantially independent of an ambient temperature in which the display device is operating and providing cooling to the display device, the amount of cooling provided being controlled to achieve a projection parameter that is determined at least in part by a user selection.

2. The method of claim 1 wherein the controlling of the amount of cooling is carried out together with adjusting power to the display to achieve the projection parameter.

3. The method of claim 2 where the projection parameter is one of display brightness, display device life, fan noise or display device temperature.

4. The display device of claim 2 wherein the display device is a light emitting diode (LED) installed in a projector, and wherein cooling is provided by one of more of a variable speed fan, a thermoelectric cooling device or a liquid cooling device, and wherein the user setting controls both degree of cooling and display brightness.

5. The method of claim 1 wherein the user selection is made using a control on a projector containing the display device or on a remote that controls the projector.

6. The method of claim 1 wherein the display device comprises a light emitting diode.

7. The method of claim 1 wherein the display device comprises a solid state laser.

8. The method of claim 1 further comprising selecting the predetermined junction temperature to provide an amount of brightness of an image displayed using the display device.

9. The method of claim 1 wherein the power comprises one of drive current and drive voltage.

10. A display device, comprising:
    a power source that generates a drive signal;
    a light source that receives the drive signal, and in response has an output brightness and an operating junction temperature; and
    a processor coupled to the light source and to the power source, wherein the processor is functional to
        compare the operating junction temperature of the light source to a predetermined junction temperature; and
        control the current or voltage generated by the power source so that the drive signal is maintains the operating junction temperature substantially at the predetermined junction temperature independent of ambient temperature, wherein the display device comprises a light emitting diode (LED) contained in a projector, wherein the light source comprises three LEDs; a red LED, a green LED and blue LED; and wherein the power source comprises separate current sources that generate separate drive currents for each of the red, green and blue LEDs, and wherein the processor controls white balance by detecting which one of the red, green and blue LEDs reaches the predetermined junction temperature first, and then instructs respective power sources of the other two LEDs to modify their respective drive currents appropriately to maintain white balance within a predetermined tolerance.

11. A display device, comprising:

a power source that generates a drive signal;

a light source that receives the drive signal, and in response has an output brightness and an operating junction temperature; and a processor coupled to the light source and to the power source, wherein the processor is functional to compare the operating junction temperature of the light source to a predetermined junction temperature; and control the current or voltage generated by the power source so that the drive signal is maintains the operating junction temperature substantially at the predetermined junction temperature independent of ambient temperature, wherein the display device is a solid state laser installed in a projector, and wherein cooling is provided by one of more one of more of a variable speed fan, a thermoelectric cooling device or a liquid cooling device, and wherein a user setting controls both degree of cooling and display brightness.

12. A display device, comprising:

a power source that generates a drive signal;

a light source that receives the drive signal, and in response has an output brightness and an operating junction temperature; and a processor coupled to the light source and to the power source, wherein the processor is functional to compare the operating junction temperature of the light source to a predetermined junction temperature; and control the current or voltage generated by the power source so that the drive signal is maintains the operating junction temperature substantially at the predetermined junction temperature independent of ambient temperature, wherein the display device comprises a solid state laser contained in a projector, wherein the light source comprises three lasers; a red laser, a green laser and blue laser; wherein the power source comprises separate current sources that generate separate drive currents for each of the red, green and blue laser, wherein the processor controls white balance by detecting which one of the red, green and blue lasers reaches the predetermined junction temperature first, and then instructs respective power sources of the other two lasers to modify their respective drive currents appropriately to maintain white balance within a predetermined tolerance; and wherein a user setting at least in part determines the white balance.

13. A display device, comprising:

a power source that generates a drive signal;

a light source that receives the drive signal, and in response has an output brightness and an operating junction temperature; and a processor coupled to the light source and to the power source, wherein the processor is functional to compare the operating junction temperature of the light source to a predetermined junction temperature; and control the current or voltage generated by the power source so that the drive signal is maintains the operating junction temperature substantially at the predetermined junction temperature independent of ambient temperature, wherein the display device is one or more light emitting diode (LED) and one or more solid state laser devices installed in a projector, and wherein cooling is provided by one of more of a variable speed fan, a thermoelectric cooling device or a liquid cooling device, and wherein the user setting controls both the degree of cooling and display brightness.

14. A display device, comprising:

a power source that generates a drive signal;

a light source that receives the drive signal, and in response has an output brightness and an operating junction temperature; and a processor coupled to the light source and to the power source, wherein the processor is functional to compare the operating junction temperature of the light source to a predetermined junction temperature; and control the current or voltage generated by the power source so that the drive signal is maintains the operating junction temperature substantially at the predetermined junction temperature independent of ambient temperature, wherein the display device comprises one or more light emitting diodes (LED) and one or more solid state laser contained in a projector, wherein the light source comprises three display devices; a red display device, a green display device and blue display device; and wherein the power source comprises separate current sources that generate separate drive currents for each of the red, green and blue display devices, and wherein the processor controls white balance by detecting which one of the red, green and blue display devices reaches the predetermined junction temperature first, and then instructs respective power sources of the other two display devices to modify their respective drive currents appropriately to maintain white balance within a predetermined tolerance.

\* \* \* \* \*

UNITED STATES PATENT AND TRADEMARK OFFICE
CERTIFICATE OF CORRECTION

| | | |
|---|---|---|
| PATENT NO. | : 8,087,787 B2 | |
| APPLICATION NO. | : 12/209128 | |
| DATED | : January 3, 2012 | |
| INVENTOR(S) | : David L. Medin | |

It is certified that error appears in the above-identified patent and that said Letters Patent is hereby corrected as shown below:

In column 10, line 23, in Claim 3, delete "where" and insert --wherein--;

In column 10, line 26, in Claim 4, delete "display device" and insert --method--;

In column 10, line 28, in Claim 4, delete "one of more" and insert --one or more--;

In column 10, line 54, in Claim 10, after "signal" please delete "is";

In column 11, line 14, in Claim 11, after "signal" please delete "is";

In column 11, line 19, in Claim 11 , delete "one of more one of more" and insert --one or more--;

In column 11, line 34, in Claim 12, after "signal" delete "is";

In column 12, line 11, in Claim 13, after "signal" delete "is";

In column 12, line 17, in Claim 13, please delete "one of more" and insert --one or more--; and In column 12, line 32, in Claim 14, after "signal" delete "is".

Signed and Sealed this
Tenth Day of April, 2012

David J. Kappos
*Director of the United States Patent and Trademark Office*